United States Patent
Kalogerakis et al.

(10) Patent No.: US 8,977,139 B2
(45) Date of Patent: Mar. 10, 2015

(54) INTEGRATED CIRCUITS IN OPTICAL RECEIVERS

(71) Applicant: Finisar Corporation, Sunnyvale, CA (US)

(72) Inventors: Georgios Kalogerakis, Mountain View, CA (US); Lionel Li, San Francisco, CA (US); The'linh Nguyen, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 207 days.

(21) Appl. No.: 13/663,056

(22) Filed: Oct. 29, 2012

(65) Prior Publication Data

US 2014/0119746 A1 May 1, 2014

(51) Int. Cl.
*H04B 10/69* (2013.01)

(52) U.S. Cl.
USPC ......................................... 398/208

(58) Field of Classification Search
CPC .................................. H04B 10/6971
USPC .......................................... 398/208
See application file for complete search history.

(56) References Cited

U.S. PATENT DOCUMENTS

| 7,902,900 B2 * | 3/2011 | Liu et al. ..................... 327/307 |
| 2003/0067662 A1 | 4/2003 | Brewer et al. |
| 2008/0240737 A1 | 10/2008 | Takahara |
| 2011/0135316 A1 | 6/2011 | Fankhauser et al. |
| 2012/0045202 A1 | 2/2012 | Jiang et al. |
| 2013/0188965 A1 * | 7/2013 | Afriat et al. .................. 398/136 |
| 2013/0229236 A1 * | 9/2013 | Poesel et al. ................. 330/308 |
| 2013/0302028 A1 * | 11/2013 | Barnard ......................... 398/25 |
| 2014/0023376 A1 * | 1/2014 | Walter ........................... 398/115 |

FOREIGN PATENT DOCUMENTS

KR  10-0958218  5/2010

OTHER PUBLICATIONS

International Search Report and Written Opinion mailed Feb. 7, 2014 in related PCT Application No. PCT/US2013/067130.

* cited by examiner

*Primary Examiner* — Leslie Pascal
(74) *Attorney, Agent, or Firm* — Maschoff Brennan

(57) ABSTRACT

A circuit may include a photodiode configured to receive an optical signal and convert the optical signal to a current signal. The circuit may also include a transimpedance amplifier coupled to the photodiode and configured to convert the current signal to a voltage signal. The circuit may also include an equalizer coupled to the transimpedance amplifier and configured to equalize the voltage signal to at least partially compensate for a loss of a high frequency component of the optical signal. The equalizer and the transimpedance amplifier may be housed within a single integrated circuit.

12 Claims, 6 Drawing Sheets

INTEGRATED CIRCUITS IN OPTICAL RECEIVERS

FIELD

The embodiments discussed herein are related to integrated circuits for optical receivers.

BACKGROUND

Optical systems use optical signals traveling through optical channels, such as optical fibers, to transmit data. As data rates of the optical signals increase, the frequency response of the optical signals may be altered. In particular, high frequency components of optical signals may be subject to more loss than low frequency components of optical signals. The loss of the high frequency components of optical signals may be caused by the optical fibers, the transmitters that generate the optical signals, among other components and factors. Loss of the high frequency components of optical signals within optical systems may reduce the ability of the optical systems to transmit data at higher speeds within proper error tolerances and may lead to data transmission failures within the optical systems.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Some example embodiments generally relate to integrated circuits.

In an embodiment, a circuit may include a photodiode configured to receive an optical signal and convert the optical signal to a current signal. The circuit may also include a transimpedance amplifier coupled to the photodiode and configured to convert the current signal to a voltage signal. The circuit may also include an equalizer coupled to the transimpedance amplifier and configured to equalize the voltage signal to at least partially compensate for a loss of a high frequency component of the optical signal. The equalizer and the transimpedance amplifier may be housed within a single integrated circuit.

In an embodiment, an integrated circuit may include an input stage configured to receive a current signal from a photodiode and convert it to a voltage signal using a transimpedance amplifier. The current signal may represent an optical signal received by the photodiode. The integrated circuit may further include an equalizer coupled to the transimpedance amplifier and configured to equalize the voltage signal to at least partially compensate for a loss of a high frequency component of the optical signal. The integrated circuit may also include a driver configured to drive the equalized voltage signal from the integrated circuit to another integrated circuit.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages of the invention will be set forth in the description that follows or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

A more particular description of the invention will be rendered by reference to embodiments thereof, which are illustrated in the appended drawings. It is appreciated that these drawings depict only some embodiments of the invention and are therefore not to be considered limiting of its scope. The invention will be described and explained with additional specificity and detail through the use of the accompanying drawings in which.

DETAILED DESCRIPTION

Some embodiments described herein may include an integrated circuit. The integrated circuit may include a transimpedance amplifier (TIA) and an equalizer circuit and may be part of an optical receiver circuit configured to convert an optical signal received over an optical channel into an electrical signal.

The TIA within the integrated circuit may be configured to convert a current signal generated by a photodiode based on a received optical signal into a voltage signal. The equalizer circuit may be configured to equalize the voltage signal to at least partially compensate for a loss of high frequency components of the received optical signal.

By integrating the TIA and the equalizer into a single integrated circuit, a driver coupled to the TIA and the equalizer circuit for driving the equalized voltage signal to other circuits and/or integrated circuits, such as a clock and data recovery circuit, may be non-linear. Allowing the driver to be non-linear may reduce the power used by the driver and thus the optical receiver circuit. Additionally or alternately, by equalizing the voltage signal generated by the TIA before driving the voltage signal to another circuit and/or integrated circuit allows the TIA to be decoupled from the other circuit and/or integrated circuit. Decoupling the TIA from another circuit and/or integrated circuit may allow for higher levels of interference between the TIA and the another circuit and/or integrated circuit than would be allowed if the voltage signal generated by the TIA was not equalized before sending the voltage signal to the another circuit and/or integrated circuit.

Figure 1A:
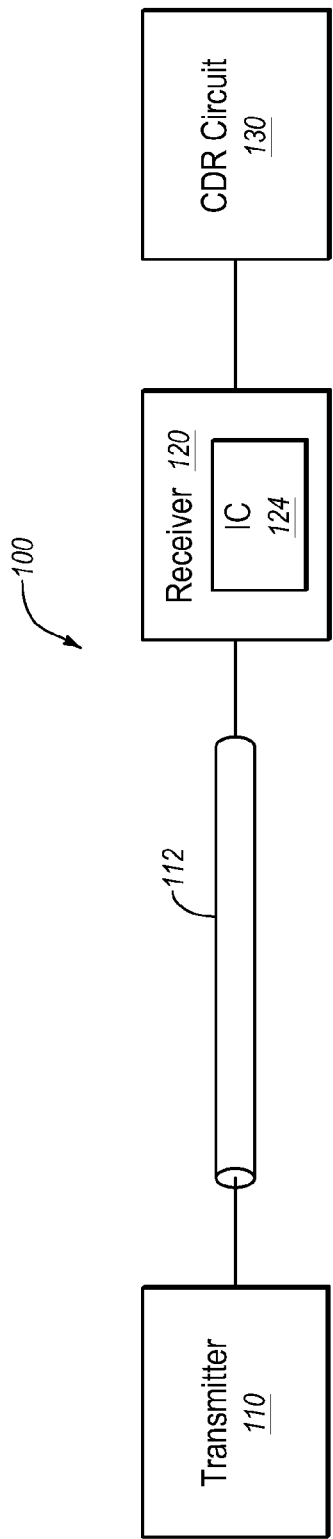
FIG. 1A is a block diagram of an example optical system that includes an integrated circuit.

FIG. 1A is a block diagram of an example optical system 100 that includes an integrated circuit 124, arranged in accordance with at least some embodiments described herein. The optical system 100 may include, but is not limited to, a transmitter 110, an optical channel 112, a receiver 120 that includes the integrated circuit 124, and a clock and data recovery circuit (CDR circuit) 130.

The transmitter 110 may be configured to generate an optical signal from an electrical signal and to transmit the optical signal through the optical channel 112. In some embodiments, the transmitter 110 may include an equalizer that may be configured to equalize the electrical signal before the electrical signal is converted into the optical signal. In these and other embodiments, the transmitter 110 may equalize the electrical signal to assist in compensating for degradation of the optical signal as it travels through the optical channel 112. Alternately or additionally, the transmitter 110 may equalize the electrical signal to assist in compensating for degradation of the optical signal due to the transmitter 110 operating at a slower rate than the data rate of the electrical and optical signals.

The optical channel 112 may be any channel configured to carry an optical signal. For example, the optical channel 112 may be an optical fiber, such as a multi-mode optical fiber, or some other type of optical fiber. The properties of the optical channel 112 may result in degradation of the optical signal as the optical signal traverses the optical channel 112. In some embodiments, the optical channel 112 may affect the higher frequency components of the optical signal more than the lower frequency components of the optical signal. In these and other embodiments, the optical channel 112 may degrade the higher frequency components more than the lower frequency components.

The receiver 120 may be coupled to the optical channel 112 and may be configured to receive the optical signal. The receiver 120 may also be configured to convert the optical signal to an electrical signal and to transmit the electrical signal to the CDR circuit 130. In particular, the receiver 120 may be configured to convert the optical signal to a current electrical signal and then convert the current electrical signal to a voltage signal that is transmitted to the CDR circuit 130.

The receiver 120 may convert the optical signal to the current electrical signal using a photodiode or some other optical to electrical converter. After converting the optical signal to the current electrical signal, the integrated circuit 124 may convert the current electrical signal to a voltage electrical signal. The integrated circuit 124 may also equalize the voltage electrical signal to at least partially compensate for the degradation of higher frequency components of the optical signal that occur due to limitations, defects, or other aspects of the transmitter 110 and/or the optical channel 112. After the integrated circuit 124 converts the optical signal into a voltage electrical signal and equalizes the voltage electrical signal, the integrated circuit 124 may send the equalized voltage electrical signal to the CDR circuit 130.

The integrated circuit 124 may house circuitry to both convert a current electrical signal into a voltage electrical signal and to equalize the voltage electrical signal. By equalizing the voltage electrical signal before sending the voltage electrical signal to the CDR circuit 130, the power used by the optical system 100 may be reduced as compared to optical systems that equalize voltage electrical signals in a CDR circuit or some other circuit besides the circuit that converts the current electrical signal to the voltage electrical signal. The power used by the optical system 100 may be reduced because the voltage electrical signal may be transmitted to the CDR circuit 130 from the receiver 120 using non-linear drivers instead of linear drivers. Non-linear drivers may be used because the non-linear effects that affected the optical signal during creation and/or transmission of the optical signal have already been accounted for by the integrated circuit 124 by equalizing the voltage electrical signal. Alternately or additionally, equalizing the voltage electrical signal allows the receiver 120 to be decoupled from the CDR circuit 130. Alternately or additionally, equalizing the voltage electrical signal may allow for higher levels of interference between the receiver 120 and the CDR circuit 130 without causing unacceptable loss of the equalized voltage electrical signal transmitted to the CDR circuit 130 from the receiver 120.

Modifications, additions, or omissions may be made to the optical system 100 without departing from the scope of the present disclosure. For example, the receiver 120 may send the equalized voltage electrical signal to another circuit other than the CDR circuit 130.

Figure 1B:
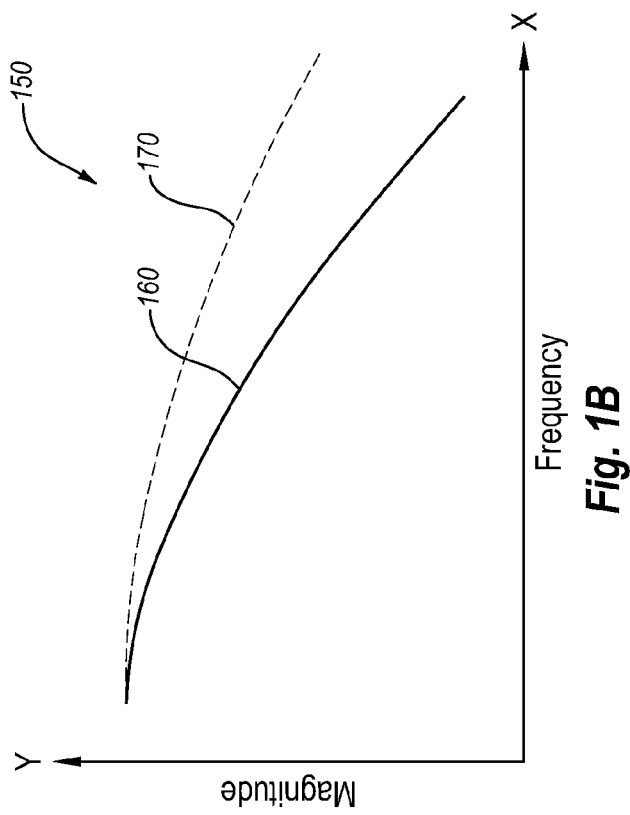
FIG. 1B illustrates a graph of a frequency response of a voltage electrical signal within the optical system of FIG. 1A.

FIG. 1B illustrates a graph 150 of a frequency response of a voltage electrical signal within the optical system 100 of FIG. 1A, arranged in accordance with at least some embodiments described herein. The graph 150 has an x-axis that represents a frequency of various frequency components of a voltage electrical signal. The y-axis of the graph 150 represents a magnitude of the frequency components of the voltage electrical signal. The graph contains a line 160 and a dashed line 170.

The line 160 indicates a magnitude of different frequency components of the voltage electrical signal after the voltage electrical signal is derived from an optical signal that passes through the optical system 100. As illustrated by the line 160, the magnitudes of the higher frequency components of the voltage electrical signal are attenuated more than the magnitudes of the lower frequency components of the voltage electrical signal. Examples of higher frequency components that may have reduced magnitudes include frequency components having frequencies above a few GHz.

The dashed line 170 indicates a magnitude of different frequency components of the voltage electrical signal after the voltage electrical signal is derived from an optical signal that passes through the optical system 100 and is equalized by the integrated circuit 124. As illustrated by the dashed line 170, the magnitudes of the higher frequency components of the voltage electrical signal are increased as compared to the magnitudes of the higher frequency components of the voltage electrical signal without equalization.

Figure 2:
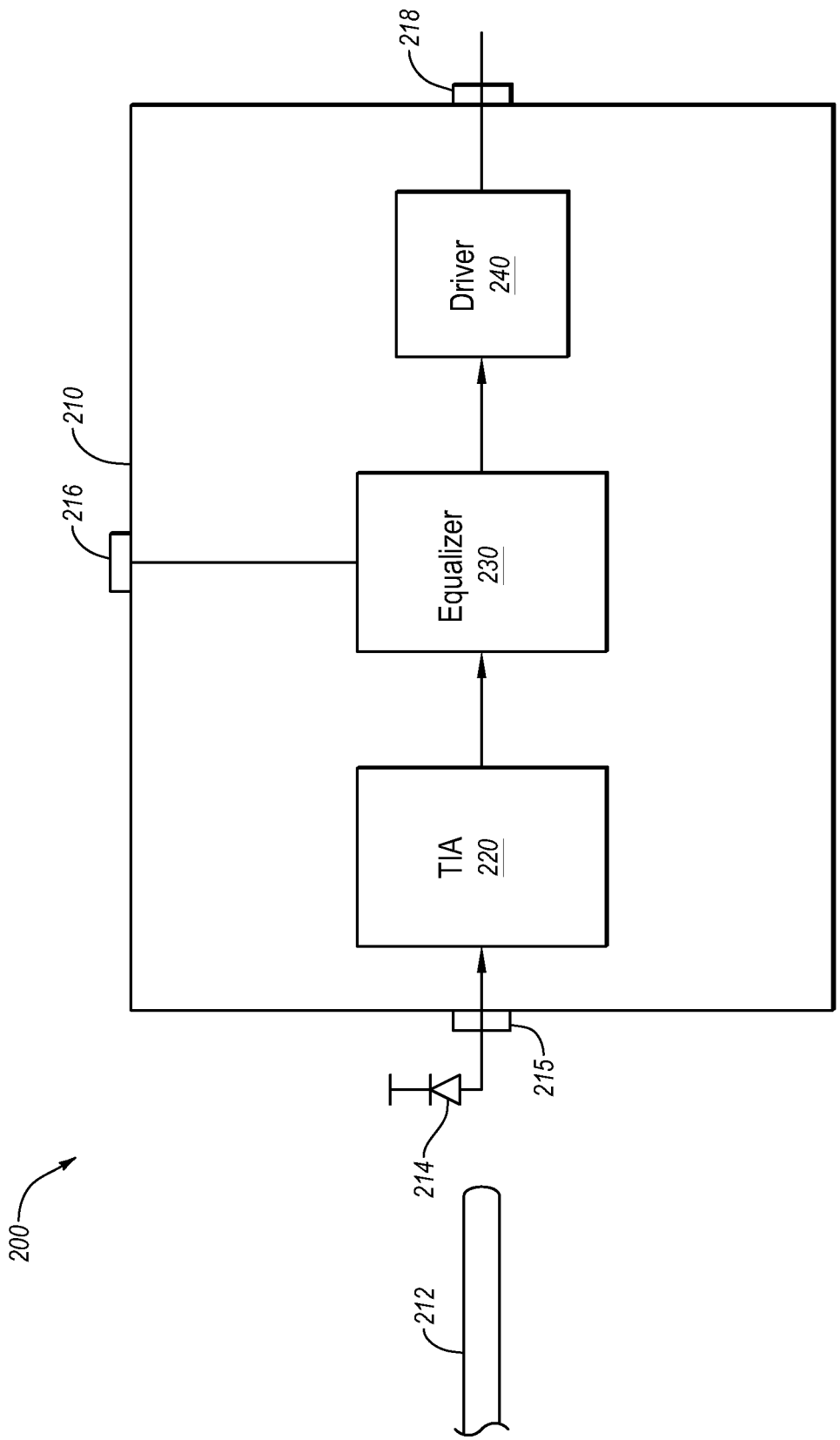
FIG. 2 is a block diagram of an example receiver that includes an integrated circuit.

FIG. 2 is a block diagram of an example receiver 200 that includes an integrated circuit 210, arranged in accordance with at least some embodiments described herein. The receiver 200 may include, but is not limited to, a photodiode 214 coupled to the integrated circuit 210. The integrated circuit 210 may include a transimpedance amplifier (TIA) 220, an equalizer 230, a driver 240, an input port 215, a communication port 216, and an output port 218.

FIG. 2 further illustrates an optical fiber 212 adjacent to the photodiode 214. The optical fiber 212 may be any type of optical fiber, such as a multi-mode fiber, that is configured to transmit an optical signal. The photodiode 214 may be configured to receive an optical signal from the optical fiber 212. The photodiode 214 may also be configured to convert the received optical signal into a current electrical signal and to send the current electrical signal to the input port 215 of the integrated circuit 210.

The TIA 220 may be configured to receive the current electrical signal from the input port 215 and to convert the current electrical signal into a voltage electrical signal. In some embodiments, the TIA 220 may also amplify the voltage electrical signal. In some embodiments, the TIA 220 may have a linear response or an approximate linear response. Thus, the TIA 220 may have no or a marginally different effect on different frequency components of the voltage electrical signal. Thus, differences in magnitudes between frequency components may be marginally maintained. The TIA 220 may send the voltage electrical signal to the equalizer 230.

The equalizer 230 may be configured to equalize the voltage electrical signal. To equalize the voltage electrical signal, the equalizer 230 may adjust the magnitude of certain frequency components of the voltage electrical signal to reduce differences between magnitudes of frequency components of the voltage electrical signal. For example, if higher frequency components of the voltage electrical signal had lower magnitudes than lower frequency components, the equalizer 230 may reduce the magnitude of lower frequency components, increase the magnitude of higher frequency components, or some combination thereof, to reduce the differences between the magnitudes of the frequency components. Equalizing the voltage electrical signal may reduce intersymbol interference of a data signal transmitted on the optical signal through the optical fiber 212. Reducing intersymbol interference may allow for better recovery of the data signal. The equalizer 230 may send the equalized voltage electrical signal to the driver 240.

In some embodiments, the equalizer 230 may be a linear equalizer, such as a continuous time linear equalizer or a linear feed forward equalizer. Alternately or additionally, the equalizer 230 may be a static equalizer, an adjustable equalizer, or a combination thereof. A static equalizer may adjust the magnitude of one or more frequency components of a signal in a consistent manner. An adjustable equalizer may adjust the magnitude of one or more frequency components of a signal based on a setting within the adjustable equalizer that may be adjusted based on an input. For example, the communication port 216 may be configured to receive an indication from an outside source of the frequency components of a voltage electrical signal whose magnitudes are affected and/or how much the magnitudes are affected. Based on the indication from the outside source, the equalizer 230 may adjust the equalization of the voltage electrical signal. The communication port 216 may be any type of communication port, such as a serial port or a parallel port. When the communication port 216 is a serial port, the integrated circuit 210 may interface with an outside source using any one of numerous serial communication protocols, such as, but not limited to, I$^2$C, SPI, serial ATA, FireWire, PCI, PCI express, among others. When the communication port 216 is a parallel port, the integrated circuit 210 may interface with an outside source using any one of numerous parallel communication protocols, such as, but not limited to ISA, parallel ATA, SCSI, among others.

The driver 240 may receive the equalized voltage electrical signal from the equalizer 230 and driver the equalized voltage electrical signal out the output port 218 to another circuit, such as an another integrated circuit. For example, the driver 240 may drive the equalized voltage electrical signal to a CDR circuit. In some embodiments, the driver 240 may have a non-linear response. The driver 240 having a non-linear response as compared to a linear response may reduce the power consumption of the driver 240 and subsequently the power consumption of the integrated circuit 210. The driver 240 may have a non-linear response because the voltage electrical signal is equalized by the equalizer 230 before being driven by the driver 240. In circumstances where a receiver, similar to the receiver 200, does not have an equalizer, a driver of the receiver may have a linear or substantially linear response to minimize changes to a voltage electrical signal; to thereby decrease errors in a data signal extracted from the voltage electrical signal.

Modifications, additions, or omissions may be made to the receiver 200 without departing from the scope of the present disclosure. For example, the receiver 200 may include an optical to electrical converter besides a photodiode. As another example, the integrated circuit 210 may not include the driver 240. In these and other embodiments, the TIA 220 and the equalizer 230 may form the integrated circuit 210 and the driver 240 may be a separate component. As another example, in some embodiments, the integrated circuit 230 may not include the communication port 216. In these and other embodiments, the equalizer 230 may be a static equalizer.

Figure 3:
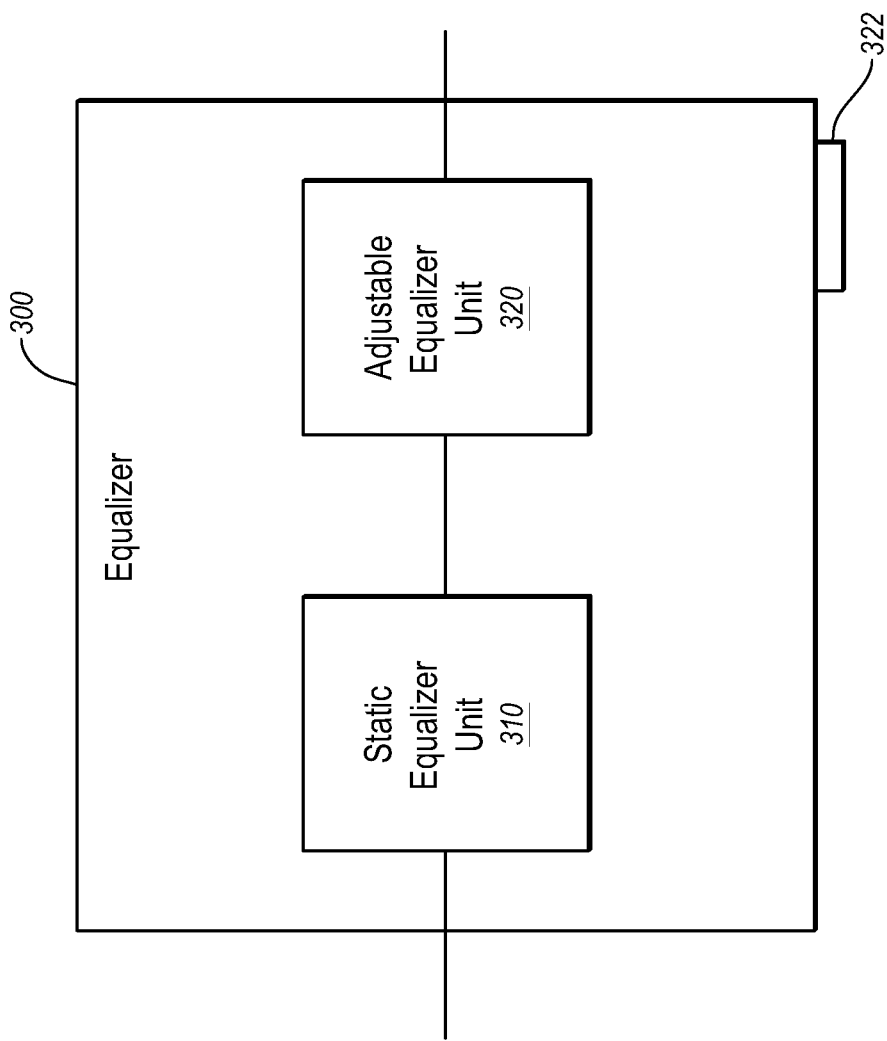
FIG. 3 is a block diagram of an example equalizer.

FIG. 3 is a block diagram of an example equalizer 300, arranged in accordance with at least some embodiments described herein. The equalizer 300 may include, but is not limited to, a static portion and an adjustable portion. The static portion may include a static equalizer unit 310 and the adjustable portion may include an adjustable equalizer unit 320. The equalizer 300 may be configured to receive a signal and provide equalization among frequency components of the signal.

The static equalizer unit 310 may be configured to provide constant equalization of a signal received by the equalizer 300. Providing constant equalization may include the static equalizer unit 310 adjusting magnitudes of set frequency components of the signal by a predetermined amount. For example, the static equalizer unit 310 may increase the magnitude of frequency components of a signal above 5 GHz by 20 dB. In some embodiments, the static equalizer unit 310 may be a digital equalizer or an analog equalizer.

The adjustable equalizer unit 320 may be configured to provide adjustable equalization of a signal received by the equalizer 300. Providing adjustable equalization may include the adjustable equalizer unit 320 adjusting the magnitudes of set frequency components of the signal by an adjustable amount, adjusting the magnitude of adjustable frequency components of the signal by a set amount, or some combination thereof. For example, the adjustable equalizer unit 320 may increase a magnitude of frequency components of a signal above 5 GHz by 20 dB and then may be adjusted to increase the magnitude of the frequency components of the signal above 5 GHz by 10 dB. As another example, the adjustable equalizer unit 320 may increase a magnitude of frequency components of a signal above 5 GHz by 20 dB and then may be adjusted to increase the magnitude of the frequency components of the signal above 7 GHz by 20 dB. In some embodiments, the adjustable equalizer unit 320 may be a digital equalizer or an analog equalizer. The adjustable equalizer unit 320 may be adjusted based on an input received through a communication port 322 in the equalizer 300.

The equalizer 300 may be incorporated into a single integrated circuit with other components, such as a TIA. For example, the equalizer 300 may be used in place of the equalizer 230 of FIG. 2. Alternately or additionally, the equalizer 300 may be part of the IC 124 of FIG. 1A.

Modifications, additions, or omissions may be made to the equalizer 300 without departing from the scope of the present disclosure. For example, the equalizer 300 may include multiple static equalizers or multiple adjustable equalizers. Alternately or additionally, the equalizer 300 may not include the static equalizer unit 310 or the adjustable equalizer unit 320.

Figure 4B:
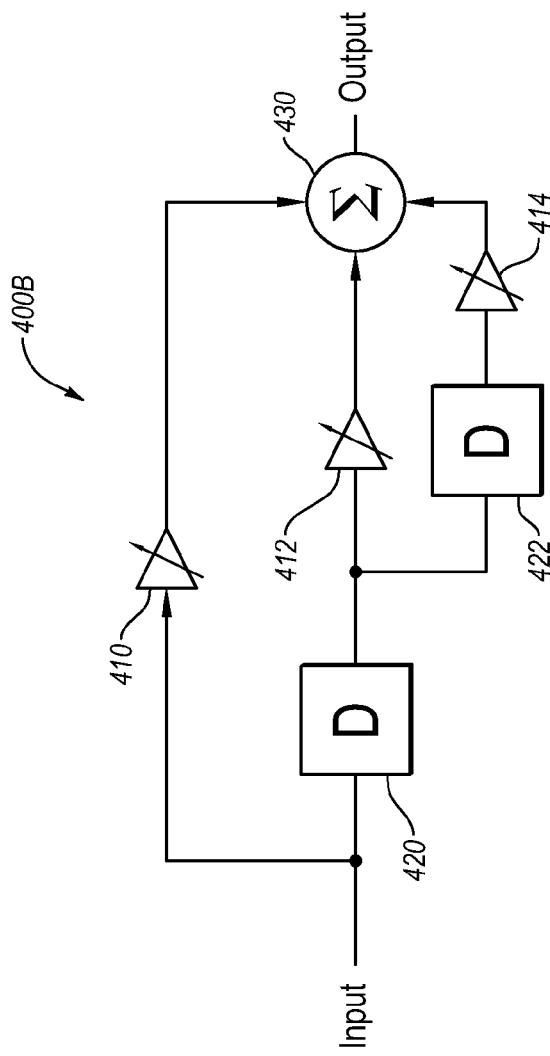
FIG. 4B illustrates an example adjustable equalizer.
Figure 4A:
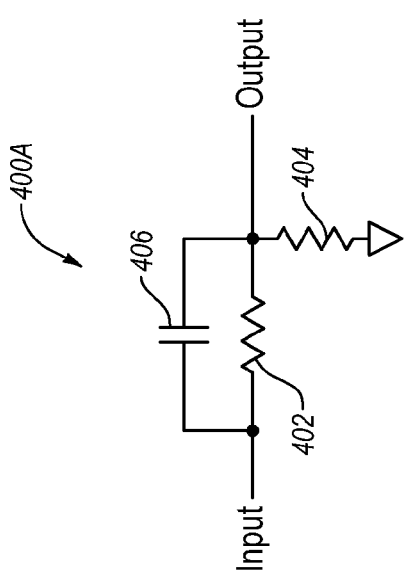
FIG. 4A illustrates an example static equalizer.

FIG. 4A illustrates an example static equalizer 400A, arranged in accordance with at least some embodiments described herein. The static equalizer 400A may include, but is not limited to, resistors 402 and 404 and capacitor 406. The resistors 402 and 404 may form a resistive divider, with the resistor 402 coupled to an input and an output of the static equalizer 400A and the resistor 404 coupled between the output and ground. The capacitor 406 may be coupled across the resistor 402 between the input and the output. The static equalizer 400A may operate as a resistive divider of lower frequency components of a signal thereby reducing the magnitude of lower frequency components. Higher frequency components of the static equalizer 400A may pass by the resistor divider by way of the capacitor 406. The static equalizer 400A may thus equalize a signal by reducing a magnitude of lower frequency components to be similar in magnitude to higher frequency components. The amount of reduction in magnitude and the higher frequencies that may pass without having a reduction in magnitude may be selected based on the values of the resistors 402 and 404 and the capacitor 406. Modifications, additions, or omissions may be made to the static equalizer 400A without departing from the scope of the present disclosure. For example, additional active and/or passive circuit elements may be included in the static equalizer 400A.

FIG. 4B illustrates an example adjustable equalizer 400B, arranged in accordance with at least some embodiments described herein. The adjustable equalizer 400B may be configured to equalize a signal based on a selected value for one or more adjustable values.

The adjustable equalizer 400B may include, but is not limited to, adjustable gain blocks 410, 412, and 414, delay blocks 420 and 422, and a summer 430. The delay blocks 420 and 422 may have the same delay or varying delays. The adjustable gain blocks 410, 412, and 414 may each be adjusted to increase and/or decrease a magnitude of a signal or a delayed portion of the signal. For example, the adjustable gain block 410 may have a gain of ½ and thus decrease a magnitude of a signal and the adjustable gain block 412 may have a gain of 2 and thus increase a magnitude of the signal or a delayed portion of the signal.

A signal at an input of the adjustable equalizer 400B may be sent to the gain block 410 and the delay block 420. The gain block 410 may adjust a magnitude of the signal and may send the adjusted signal to the summer 430. The delay block 420 may delay the signal. A magnitude of the delayed signal may be adjusted by the gain block 412. The adjusted delayed signal from the gain block 412 may be sent to the summer 430. The delay block 422 may further delay the delayed signal and may send the twice-delayed signal to the gain block 414. The gain block 414 may adjust a magnitude of the twice-delayed signal and may send the adjusted twice-delayed signal to the summer 430. The summer 430 may sum the adjusted signal, the adjusted delayed signal, and the adjusted twice-delayed signal and may output the result on an output of the adjustable equalizer 400B. The adjustable equalizer 400B may equalize a signal by increasing a magnitude of higher frequency components of a signal to be more similar to a magnitude of lower frequency components. Modifications, additions, or omissions may be made to the adjustable equalizer 400B without departing from the scope of the present disclosure. For example, the adjustable equalizer 400B may be configured with an additional delay block and gain block. Alternately or additionally, the adjustable equalizer 400B may be configured with a feedback loop and a gain block.

Figure 5:
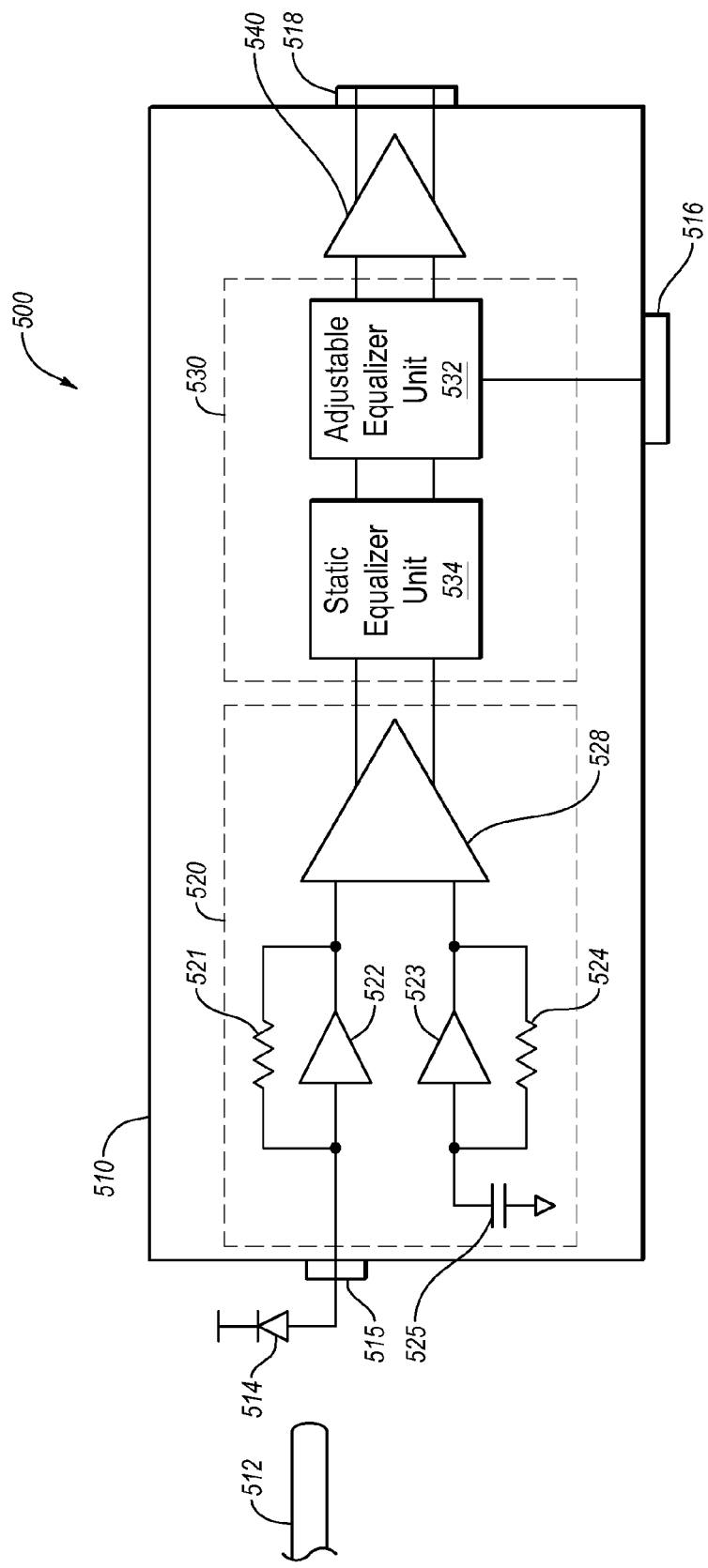
FIG. 5 is a block diagram of another example receiver that includes an integrated circuit.

FIG. 5 is a block diagram of another example receiver 500 that includes an integrated circuit 510, arranged in accordance with at least some embodiments described herein. The receiver 500 may include, but is not limited to, a photodiode 514 coupled to the integrated circuit 510. The integrated circuit 510 may include a TIA 520, an equalizer 530, a driver 540, an input port 515, a communication port 516, and an output port 518.

FIG. 5 further illustrates an optical fiber 512 adjacent to the photodiode 514. The optical fiber 512 may be any type of optical fiber, such as a multi-mode fiber, that is configured to transmit an optical signal. The photodiode 514 may be configured to receive an optical signal from the optical fiber 512. The photodiode 514 may also be configured to convert the optical signal into a current electrical signal and to send the current electrical signal to the input port 515 of the integrated circuit 510.

The TIA 520 may be configured to receive the current electrical signal from the input port 515 and to convert the current electrical signal into a pair of differential voltage electrical signals. The TIA 520 may include a first amplifier 522 and a first resistor 521 that may be configured to convert the current electrical signal from the photodiode 514 into a first voltage signal of the pair of differential voltage electrical signals. The TIA 520 may also include a capacitor 525, a second amplifier 523, and a second resistor 524 that may be configured to generate a second voltage signal of the pair of differential voltage electrical signals based on the current signal and/or the first voltage signal. The first and second voltage signals may be amplified by an amplifier 528 and sent to the equalizer 530.

In some embodiments, the TIA 520 may have a linear response or an approximate linear response. Thus, the TIA 520 may have no or a marginally different effect on different frequency components of the pair of differential voltage electrical signals. Thus, differences in magnitudes between frequency components may be marginally maintained.

The equalizer 530 may be configured to equalize the pair of differential voltage electrical signals. The equalizer 500 may include, but is not limited to, a static portion and an adjustable portion. The static portion may include a static equalizer unit 534 and the adjustable portion may include an adjustable equalizer unit 532. The static equalizer unit 534 may be configured to equalize the pair of differential voltage electrical signals by adjusting a magnitude of set frequency components of the pair of differential voltage electrical signals by a predetermined amount. The static equalizer unit 534 may decrease or increase the magnitude of higher or lower frequency components of the pair of differential voltage electrical signals to equalize the pair of differential voltage electrical signals.

The adjustable equalizer unit 532 may be configured to provide adjustable equalization of the pair of differential voltage electrical signals. In some embodiments, an amount of equalization provided by the adjustable equalizer unit 532 may be determined based on an input received through the communication port 516. In some embodiments, the adjustable equalizer unit 532 may be configured to further reduce and/or increase high or low frequency components of the pair of differential voltage electrical signals based on the equalization performed by the static equalizer unit 534. Alternately or additionally, the adjustable equalizer unit 532 may be configured to reduce a magnitude of a frequency component whose magnitude is increased by the static equalizer unit 534 or increase a magnitude of a frequency component whose magnitude is decreased by the static equalizer unit 534. The adjustable equalizer unit 532 may be used to provide finer tuned equalization of the pair of differential voltage electrical signals. In some embodiments, the static and the adjustable equalizer units 534 and 532 may be linear equalizers. Alternately or additionally, the static and the adjustable equalizer units 534 and 532 may be digital equalizers, analog equalizers, or some combination thereof. The equalizer 530 may send the equalized pair of differential voltage electrical signals to the driver 540.

The driver 540 may receive the equalized pair of differential voltage electrical signals from the equalizer 530 and driver the equalized pair of differential voltage electrical signals out the output port 218 to another circuit, such as an another integrated circuit. For example, the driver 540 may drive the equalized pair of differential voltage electrical signals to a CDR circuit. In some embodiments, the driver 540 may have a non-linear response.

Modifications, additions, or omissions may be made to the receiver 500 without departing from the scope of the present disclosure. For example, the integrated circuit 510 may not include the driver 540. In these and other embodiments, the TIA 520 and the equalizer 530 may form the integrated circuit 510 and the driver 540 may be a separate component. In some embodiments, the TIA 520 may include additional active and/or passive circuit elements. In some embodiments, the equalizer 530 may include additional static or adjustable equalizer units or may not include either the static equalizer unit 534 or the adjustable equalizer unit 532.

Figure 6:
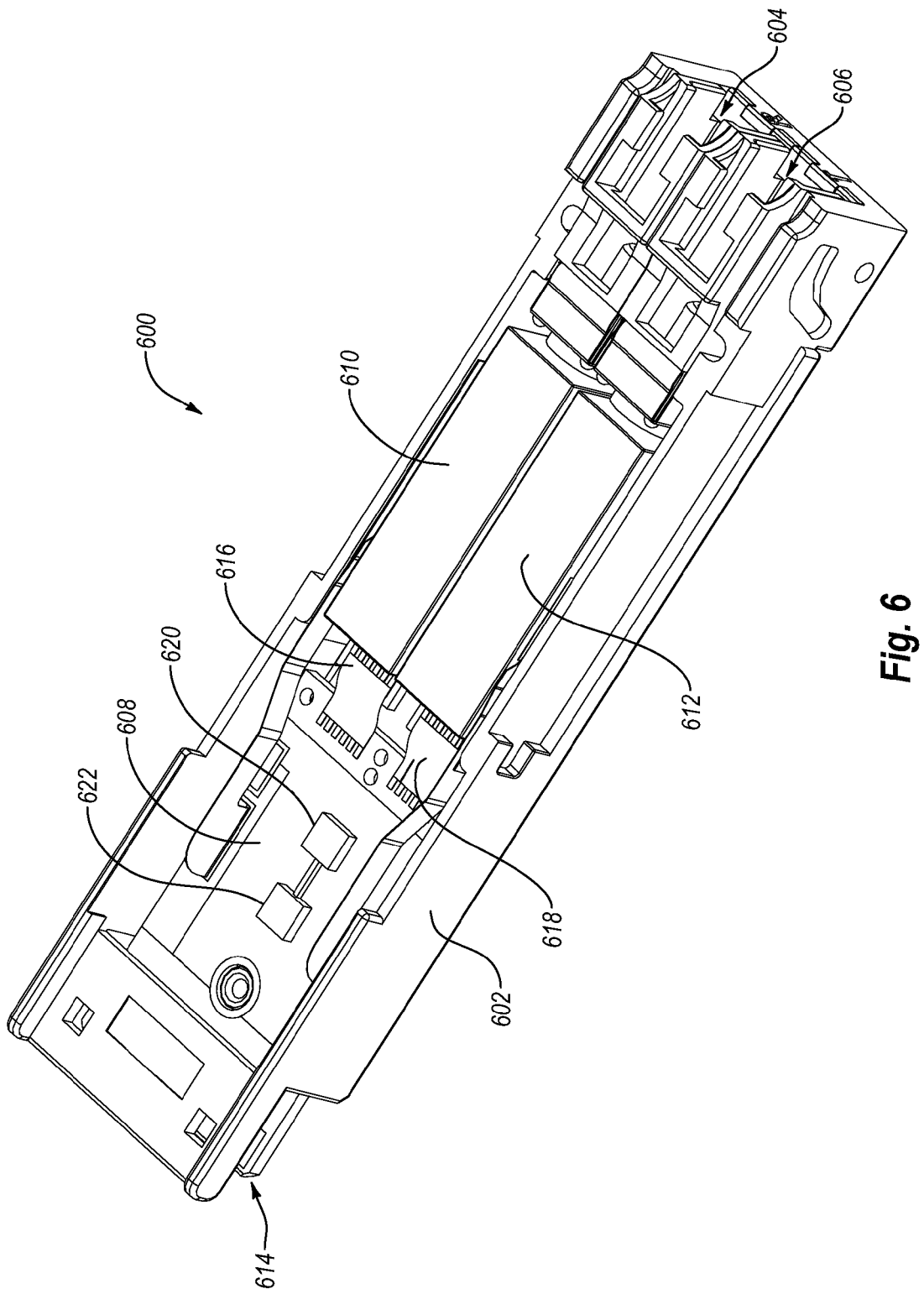
FIG. 6 is a perspective view of an example optoelectronic module that may include an integrated circuit.

FIG. 6 is a perspective view of an example optoelectronic module 600 (hereinafter "module 600") that may include an integrated circuit 620, arranged in accordance with at least some embodiments described herein. The module 600 may be configured for use in transmitting and receiving optical signals in connection with a host device (not shown).

As illustrated, the module 600 may include, but is not limited to, a bottom housing 602; a receive port 604 and a transmit port 606, both defined in the bottom housing 602; a PCB 608 positioned within the bottom housing 602, the PCB 608 having the integrated circuit 620 and a second integrated circuit 622 positioned hereon; and a receiver optical subassembly (ROSA) 610 and a transmitter optical subassembly (TOSA) 612 also positioned within the bottom housing 602. An edge connector 614 may be located on an end of the PCB 608 to enable the module 600 to electrically interface with the host device. As such, the PCB 608 facilitates electrical communication between the host device and the ROSA 610 and TOSA 612.

The module 600 may be configured for optical signal transmission and reception at a variety of data rates including, but not limited to, 1 Gb/s, 10 Gb/s, 20 Gb/s, 40 Gb/s, 100 Gb/s, or higher. Furthermore, the module 600 may be configured for optical signal transmission and reception at various distinct wavelengths using wavelength division multiplexing (WDM) using one of various WDM schemes, such as Coarse WDM, Dense WDM, or Light WDM. Furthermore, the module 600 may be configured to support various communication protocols including, but not limited to, Fibre Channel and High Speed Ethernet. In addition, although illustrated in a particular form factor in FIG. 6, more generally, the module 600 may be configured in any of a variety of different form factors including, but not limited to, the Small Form-factor Pluggable (SFP), the enhanced Small Form-factor Pluggable (SFP+), the 10 Gigabit Small Form Factor Pluggable (XFP), the C Form-factor Pluggable (CFP) and the Quad Small Form-factor Pluggable (QSFP) multi-source agreements (MSAs).

The ROSA 610 may house one or more optical receivers, such as photodiodes, that are electrically coupled to an electrical interface 616. The one or more optical receivers may be configured to convert optical signals received through the receive port 604 into corresponding current electrical signals that are relayed to the integrated circuit 620 through the electrical interface 616 and the PCB 608. The TOSA 612 may house one or more optical transmitters, such as lasers, that are electrically coupled to another electrical interface 618. The one or more optical transmitters may be configured to convert electrical signals received from a host device by way of the PCB 608 and the electrical interface 618 into corresponding optical signals that are transmitted through the transmit port 606.

The integrated circuit 620, which may be similar to and/or correspond to the integrated circuits 124, 210, or 510 of FIG. 1, 2, or 5 respectively, may be configured to convert the current electrical signals to voltage electrical signals and to equalize the voltage electrical signals. The integrated circuit 620 may drive the equalized voltage electrical signals to the second integrated circuit 622. In some embodiments, the second integrated circuit may be a CDR circuit. In some embodiments, an integrated circuit, such as the integrated circuits 124, 210, or 510 of FIG. 1, 2, or 5 respectively may be incorporated into the ROSA 610 and may be used to convert current electrical signals to equalized voltage electrical signals. Modifications, additions, or omissions may be made to the module 600 without departing from the scope of the present disclosure.

The module 600 illustrated in FIG. 6 is one architecture in which embodiments of the present disclosure may be employed. This specific architecture is only one of countless architectures in which embodiments may be employed. The scope of the present disclosure is not intended to be limited to any particular architecture or environment.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A circuit comprising:
    a photodiode configured to receive an optical signal and to convert the optical signal to a current signal;
    a transimpedance amplifier coupled to the photodiode and configured to convert the current signal to a voltage signal; and
    an equalizer coupled to the transimpedance amplifier, the equalizer comprising:
        a static portion configured to provide constant equalization of the voltage signal; and
        an adjustable portion configured to provide adjustable equalization of the voltage signal, such that the equalizer is configured to equalize the voltage signal to at least partially compensate for a loss of a high frequency component of the optical signal, the equalizer and the transimpedance amplifier being housed within a single integrated circuit.

2. The circuit of claim 1, further comprising a driver coupled to the equalizer, the driver configured to drive the equalized voltage signal and being housed within the single integrated circuit.

3. The circuit of claim 2, wherein the driver comprises a non-linear driver.

4. The circuit of claim 2, wherein the driver is configured to drive the equalized voltage signal to a clock and data recovery circuit in another integrated circuit separate from the single integrated circuit.

5. The circuit of claim 1, wherein the voltage signal comprises a pair of differential voltage signals.

6. An integrated circuit comprising:
    an input configured to receive a current signal from a photodiode, the current signal representative of an optical signal received by the photodiode;
    a transimpedance amplifier coupled to the input and configured to convert the current signal to a voltage signal;

an equalizer coupled to the transimpedance amplifier, the equalizer comprising:
  a static portion configured to provide constant equalization of the voltage signal; and
  an adjustable portion configured to provide adjustable equalization of the voltage signal, such that the equalizer is configured to equalize the voltage signal to at least partially compensate for a loss of a high frequency component of the optical signal; and
a driver configured to drive the equalized voltage signal from the integrated circuit to another integrated circuit.

7. The integrated circuit of claim 6, wherein the static portion of the equalizer comprises an analog equalizer.

8. The integrated circuit of claim 6, wherein the adjustable portion of the equalizer comprises a digital equalizer.

9. The integrated circuit of claim 6, wherein the driver comprises a non-linear driver.

10. The integrated circuit of claim 9, wherein the transimpedance amplifier has a substantially linear frequency response.

11. The integrated circuit of claim 6, wherein the optical signal is generated by a transmitter, the transmitter comprising a transmitting equalizer.

12. The integrated circuit of claim 6, wherein the voltage signal comprises a pair of differential voltage signals.

* * * * *